(12) United States Patent
Suzuki et al.

(10) Patent No.: US 12,012,003 B2
(45) Date of Patent: Jun. 18, 2024

(54) VEHICLE DRIVE DEVICE

(71) Applicant: AISIN CORPORATION, Aichi (JP)

(72) Inventors: Takahiro Suzuki, Kariya (JP); Tadaaki Watanabe, Kariya (JP)

(73) Assignee: AISIN CORPORATION, Aichi (JP)

( * ) Notice: Subject to any disclaimer, the term of this patent is extended or adjusted under 35 U.S.C. 154(b) by 431 days.

(21) Appl. No.: 17/420,172

(22) PCT Filed: Jan. 30, 2020

(86) PCT No.: PCT/JP2020/003451
§ 371 (c)(1),
(2) Date: Jul. 1, 2021

(87) PCT Pub. No.: WO2020/158869
PCT Pub. Date: Aug. 6, 2020

(65) Prior Publication Data

US 2022/0089013 A1   Mar. 24, 2022

(30) Foreign Application Priority Data

Jan. 30, 2019   (JP) ................................. 2019-014891

(51) Int. Cl.
*B60K 6/48*   (2007.10)
*B60K 6/52*   (2007.10)
(Continued)

(52) U.S. Cl.
CPC ................. *B60K 6/48* (2013.01); *B60K 6/52* (2013.01); *B60L 7/26* (2013.01); *B60W 10/08* (2013.01);
(Continued)

(58) Field of Classification Search
CPC ... B60K 6/48; B60K 6/52; B60L 7/26; B60W 10/08; B60W 30/18127; B60W 10/188; B60W 10/192
See application file for complete search history.

(56) References Cited

U.S. PATENT DOCUMENTS

2002/0056332 A1   5/2002   Suzuki
2015/0219002 A1*  8/2015   Hayase ................... F01P 7/165
                                                      123/41.31
(Continued)

FOREIGN PATENT DOCUMENTS

EP      3 275 751 A1   1/2018
JP      2018-146019 A  9/2018
(Continued)

OTHER PUBLICATIONS

Written Opinion for PCT/JP2020/003451 dated Mar. 31, 2020.
(Continued)

*Primary Examiner* — Dale W Hilgendorf
*Assistant Examiner* — Hana Lee
(74) *Attorney, Agent, or Firm* — Sughrue Mion, PLLC (57) ABSTRACT

An apparatus including a transmission mechanism in a power transfer path between a drive source and wheels; an oil pressure control device supplying lubricating oil to the transmission mechanism; and a control part outputting an electrical instruction to increase a flow rate of the supplied lubricating. When the control part outputs an electrical instruction to the oil pressure control device to increase a flow rate of lubricating oil supplied to the transmission mechanism, and determines that the flow rate of lubricating oil supplied to the transmission mechanism from the oil pressure control device does not increase as indicated by the electrical instruction (time t1), the control part considers that the oil pressure control device is in an abnormal state, and can impose a limitation that an absolute value of torque of the transmission mechanism transferred between the wheels and the drive source be reduced (time t1-t5).

18 Claims, 4 Drawing Sheets

(51) Int. Cl.
  *B60L 7/26*      (2006.01)
  *B60W 10/08*    (2006.01)
  *B60W 10/188*   (2012.01)
  *B60W 10/192*   (2012.01)
  *B60W 30/18*    (2012.01)
(52) U.S. Cl.
  CPC ..... *B60W 30/18127* (2013.01); *B60W 10/188* (2013.01); *B60W 10/192* (2013.01)

(56) References Cited

U.S. PATENT DOCUMENTS

| | | | |
|---|---|---|---|
| 2017/0088113 A1* | 3/2017 | Morita | F01P 5/12 |
| 2018/0058570 A1* | 3/2018 | Osborn | F16H 57/0435 |
| 2018/0079418 A1* | 3/2018 | Iwasa | B60L 50/16 |
| 2018/0172143 A1* | 6/2018 | Tsukizaki | F16H 61/12 |

FOREIGN PATENT DOCUMENTS

| | | |
|---|---|---|
| WO | 2016/207953 A1 | 12/2016 |
| WO | 2018/189896 A1 | 10/2018 |

OTHER PUBLICATIONS

International Search Report for PCT/JP2020/003451 dated Mar. 31, 2020.
Extended European Search Report dated Feb. 15, 2022 from the European Patent Office in EP Application No. 20749005.3.

* cited by examiner

VEHICLE DRIVE DEVICE

CROSS-REFERENCE TO RELATED APPLICATIONS

This application is a National Stage of International Application No. PCT/JP2020/003451 filed Jan. 30, 2020, which claims priority under U.S.C. § 119(a) to Japanese Patent Application No. JP2019-014891 filed on Jan. 30, 2019.

TECHNICAL FIELD

The technique relates to a vehicle drive device mounted on a vehicle, e.g., an automobile.

BACKGROUND ART

Conventionally, vehicles such as automobiles having mounted thereon a vehicle drive device including a transmission mechanism, etc., have been widely used. A transfer mechanism such as a transmission mechanism used in such a vehicle drive device may include, for example, moving parts such as a planetary gear and a transmission planetary gear unit. Since such moving parts generate heat during traveling, oil pressure generated by an oil pump is supplied as lubricating oil to the moving parts from an oil pressure control device to lubricate and cool the moving parts.

There is a known vehicle drive device including an oil pressure control device that can switch the amount of lubricating oil supplied to a transfer mechanism from the oil pressure control device between a high flow rate and a low flow rate depending on timing because heat generated by the transfer mechanism is, for example, large upon changing gears and smaller upon steady traveling in which gear changes are not performed than upon changing gears (see, for example, Patent Literature 1). In the vehicle drive device, for example, when heat generated by the transfer mechanism is large, the amount of lubricating oil supplied to the transfer mechanism from the oil pressure control device is switched to a high flow rate to prevent overheating, and when heat generated by the transfer mechanism is small, the supplied amount is switched to a low flow rate to achieve an improvement in gas mileage.

CITATIONS LIST

Patent Literature

Patent Literature 1: JP 2018-146019 A

SUMMARY OF THE DISCLOSURE

Technical Problems

However, in the vehicle drive device described in Patent Literature 1, upon switching the amount of lubricating oil supplied from the oil pressure control device from a low flow rate to a high flow rate to deal with an increase in the amount of heat generated by the transfer mechanism, for example, due to sticking in a signal solenoid valve or a switching valve, there is a possibility that the amount of lubricating oil supplied may be fixed at the low flow rate. In this case, despite the increase in the amount of heat generated by the transfer mechanism, the amount of lubricating oil supplied remains at the low flow rate, and thus, the transfer mechanism may go into an overheating state.

Thus, the present disclosure provides a vehicle drive device capable of preventing overheating of a transfer mechanism even if an abnormal state in which the amount of lubricating oil supplied to the transfer mechanism does not increase to a desired supplied amount occurs upon increasing the amount of lubricating oil supplied to the transfer mechanism to deal with an increase in the amount of heat generated by the transfer mechanism.

Solutions to Problems

The present vehicle drive device includes a transfer mechanism interposed in a power transfer path between a drive source and wheels; an oil pressure supplying part that can supply lubricating oil to the transfer mechanism; and a control part that can output an electrical instruction to the oil pressure supplying part to increase a flow rate of lubricating oil supplied to the transfer mechanism, and when the control part outputs an electrical instruction to the oil pressure supplying part to increase a flow rate of lubricating oil supplied to the transfer mechanism, and determines that a flow rate of lubricating oil supplied to the transfer mechanism from the oil pressure supplying part does not increase as indicated by the electrical instruction, the control part considers that the oil pressure supplying part is in an abnormal state, and can impose a limitation that an absolute value of torque of the transfer mechanism transferred between the wheels and the drive source be reduced.

Advantageous Effects of Various Aspects of the Disclosure

According to the present vehicle drive device, upon increasing the amount of lubricating oil supplied to the transfer mechanism to deal with an increase in the amount of heat generated by the transfer mechanism, even if an abnormal state occurs in which the amount of lubricating oil supplied to the transfer mechanism does not increase to a desired supplied amount, overheating of the transfer mechanism can be prevented.

DESCRIPTION OF EMBODIMENTS

An embodiment of a hybrid vehicle 100 according to the present disclosure will be described below based on FIGS. 1 to 4. In the present embodiment, the term "drive-coupled" refers to a state in which rotating elements are coupled together such that they can transfer drive power, and is used as a concept including a state in which the rotating elements are coupled together such that they rotate together, or a state in which the rotating elements are coupled together such that they can transfer drive power through a clutch, etc.

Figure 1:
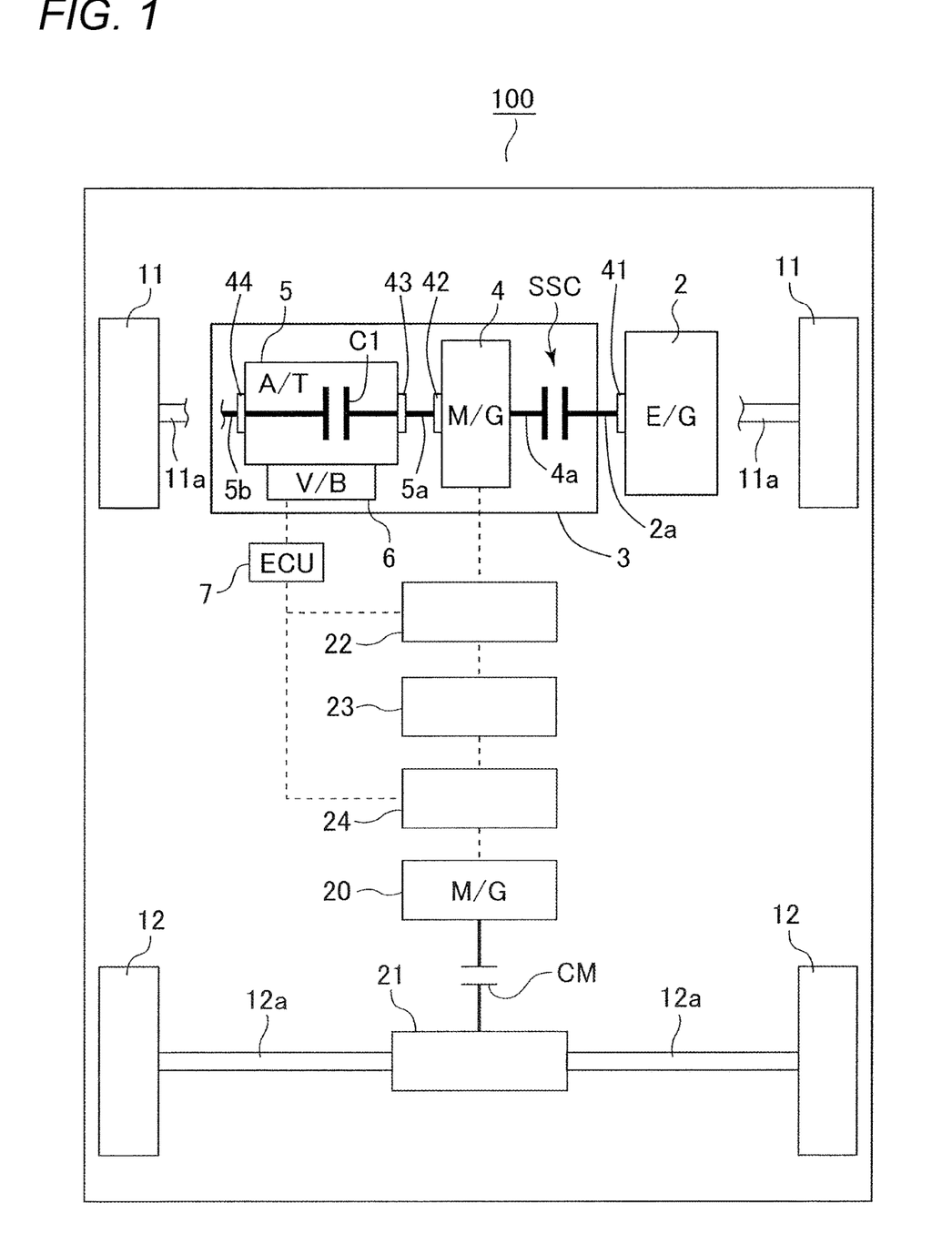
FIG. 1 is skeleton diagram showing a hybrid vehicle according to an embodiment.

As shown in FIG. 1, the hybrid vehicle 100 includes an engine (E/G) 2 which is an example of a drive source and a hybrid drive device (vehicle drive device) 3 connected to an output shaft 2a of the engine 2, as a drive system of left and right front wheels (wheels) 11, and includes a rear motor (M/G) 20 as a drive system of left and right rear wheels 12. By this, it is configured such that the front wheels 11 can perform hybrid traveling of a so-called single-motor parallel system, and the rear wheels 12 can perform EV traveling, and by simultaneously driving the front wheels 11 and the rear wheels 12, four-wheel drive is also possible. Note that although the present embodiment describes a case in which the hybrid vehicle 100 includes the rear motor 20 that can drive the rear wheels 12, the configuration is not limited thereto, and the hybrid vehicle 100 may not include the rear motor 20.

First, the drive system of the front wheels 11 will be described. An output shaft 5b of the hybrid drive device 3 is drive-coupled to a differential device which is not shown, and drive power is transferred to the left and right front wheels 11 from the differential device through left and right drive shafts 11a. The engine rotational speed Ne and engine torque Te of the engine 2 are freely controlled based on instructions from an ECU 7 which will be described later. In addition, on an exterior side of the output shaft 2a of the engine 2 there is provided an engine rotational speed sensor 41 that detects the rotational speed of the output shaft 2a, i.e., engine rotational speed Ne.

The hybrid drive device 3 is configured to roughly include a clutch SSC for engine connection, a motor/generator (M/G, a drive source, and a rotating electrical machine) 4, a transmission mechanism (A/T and a transfer mechanism) 5, and the ECU (control part) 7 that controls these components. The clutch SSC is interposed between the output shaft 2a of the engine 2 and a rotor shaft (rotating shaft) 4a of the motor/generator (hereinafter, simply referred to as "motor") 4, and can provide friction engagement therebetween. Namely, the clutch SSC is interposed between the output shaft 2a of the engine 2 and an input shaft 5a of the transmission mechanism 5, and is provided so as to be able to connect and disconnect power transfer therebetween. Based on an instruction from the ECU 7, the engagement state of the clutch SSC is freely controlled according to clutch oil pressure $P_{SSC}$ supplied from an oil pressure control device (V/B) 6, and the torque capacity of the clutch SSC is also freely controlled.

The motor 4 is provided in a power transfer path between the clutch SSC and the input shaft 5a of the transmission mechanism 5, i.e., between the output shaft 2a of the engine 2 and the input shaft 5a of the transmission mechanism 5. The motor 4 includes a stator and a rotor whose depiction is omitted, and the rotor shaft 4a having the rotor connected thereto is drive-coupled to an output side of the clutch SSC. The motor rotational speed Nm and motor torque Tm (torque outputted from the motor 4) of the motor 4 are freely controlled based on instructions from the ECU 7. In addition, on an exterior side of the rotor shaft 4a of the motor 4 there is provided a motor rotational speed sensor 42 that detects the rotational speed of the rotor shaft 4a, i.e., motor rotational speed Nm. The rotor shaft 4a is directly drive-coupled to the input shaft 5a of the transmission mechanism 5.

The motor 4 is connected to a battery 23 through an inverter 22. By this, electric power outputted from the battery 23 is fed to the motor 4 through the inverter 22, by which the motor 4 is driven. In addition, by idling the motor 4 upon traveling using the engine 2 or upon coasting, electric power is generated and can be charged to the battery 23.

The transmission mechanism 5 is interposed in a power transfer path between the engine 2 and the front wheels 11, and includes the input shaft (input member) 5a driven by the engine 2 and the output shaft 5b drive-coupled to the front wheels 11, and can change the gear ratio between the input shaft 5a and the output shaft 5b. The transmission mechanism 5 is composed of, for example, a stepped transmission having moving parts (not shown) such as a planetary gear and a transmission planetary gear unit, and is configured to change the gear ratio by changing a transfer path by changing the friction engagement states of a plurality of friction engagement elements (clutches and a brake) based on oil pressure supplied from the oil pressure control device 6. In addition, the transmission mechanism 5 includes a lubricating oil passage (LUBE) 5L (see FIG. 2). Lubricating oil supplied to the lubricating oil passage 5L from the oil pressure control device 6 lubricates and cools the moving parts such as the planetary gear and the transmission planetary gear unit of the transmission mechanism 5.

As some of the plurality of friction engagement elements, the transmission mechanism 5 includes a first clutch C1 and a second clutch, a brake, etc., which are not shown. The first clutch C1 is configured to freely connect and disconnect power transfer between the input shaft 5a and the output shaft 5b, and can provide friction engagement by switching between a disengaged state, a slip-engaged state, and a completely engaged state. Based on an instruction from the ECU 7, the engagement state of the first clutch C1 is freely controlled according to first clutch oil pressure $P_{C1}$ supplied from the oil pressure control device 6, and the torque capacity of the first clutch C1 is also freely controlled.

In addition, on an exterior side of the input shaft 5a of the transmission mechanism 5 there is provided an input rotational speed sensor 43 that detects the rotational speed of the input shaft 5a, i.e., input rotational speed (in the present embodiment, the same as the motor rotational speed Nm). Furthermore, on an exterior side of the output shaft 5b of the transmission mechanism 5 there is provided an output rotational speed sensor 44 that detects the rotational speed of the output shaft 5b, i.e., output rotational speed Nout. Since the output shaft 5b is, as described above, drive-coupled to the front wheels 11 through the differential device, etc., the output rotational speed sensor 44 can also be used to detect vehicle speed V.

Note that in the present embodiment, description is made assuming that the first clutch C1 attains first forward gear by, for example, going into an engaged state with a one-way clutch which is not shown, i.e., first forward gear of the transmission mechanism 5 is attained by only one first clutch C1 being engaged. Note, however, that the configuration is not limited thereto, and for example, the first clutch C1 may attain a shift speed that allows the hybrid vehicle 100 to start, such as first forward gear or third forward gear, by being simultaneously engaged with another friction engagement element.

In addition, although in the present embodiment description is made assuming that the transmission mechanism 5 is a stepped transmission, the transmission mechanism 5 may be, for example, a belt, toroidal, or cone-ring continuously variable transmission, and in that case, the first clutch C1 can be considered to be a clutch that is included in the continuously variable transmission and can connect and disconnect power transfer.

In addition, the above-described clutch SSC and first clutch C1 are friction-engageable elements whose transferable torque capacity can vary in magnitude depending on the magnitude of oil pressure that presses two or more friction engagement members, and are normally configured to include a piston that presses the friction engagement members, a hydraulic cylinder that presses the piston, and a return spring that acts in an opposite direction to the hydraulic cylinder. Note, however, that the configuration is not limited thereto, and it may be structured such that a piston is driven by differential pressure between opposed cylinders or it may be structured such that the friction engagement members are pressed by, for example, an arm that is allowed to move by a hydraulic actuator. Note that although the present embodiment describes a case in which the clutch SSC, the first clutch C1, etc., are hydraulically controlled friction engagement elements, the configuration is not limited thereto, and for example, electromagnetic clutches may be applied.

The states of the clutch SSC and the first clutch C1 are, as described above, controlled by the magnitude of oil pressure, and are classified into a "disengaged state" in which the friction engagement members are separated from each other, a "slip-engaged state" in which torque capacity to be transferred is generated while slipping, and a "completely engaged state" in which the friction engagement members are fastened together by increasing oil pressure as much as possible. Note that the "slip-engaged state" can be defined to be a period from when the piston strokes after the disengaged state and reaches a stroke end where the piston comes into contact with the friction engagement members until the rotational speeds of the friction engagement members are synchronized with each other, and the "disengaged state" can be defined to be a state in which the piston is less than the stroke end and is separated from the friction engagement members.

In addition, the hybrid drive device 3 includes a mechanical oil pump (MO/P) 30 (see FIG. 2); and a motor-driven oil pump (EO/P) 31 (see FIG. 2) whose amount of discharge can be controlled by an electrical signal. The mechanical oil pump 30 is provided on a transfer shaft disposed parallel to the input shaft 5a of the transmission mechanism 5. The mechanical oil pump 30 is connected to the input shaft 5a by a chain, etc., and is driven by power of the input shaft 5a transferred thereto through the transfer shaft. The motor-driven oil pump 31 is driven independently of the mechanical oil pump 30, by a motor different from the engine 2 and the motor 4.

Figure 2:
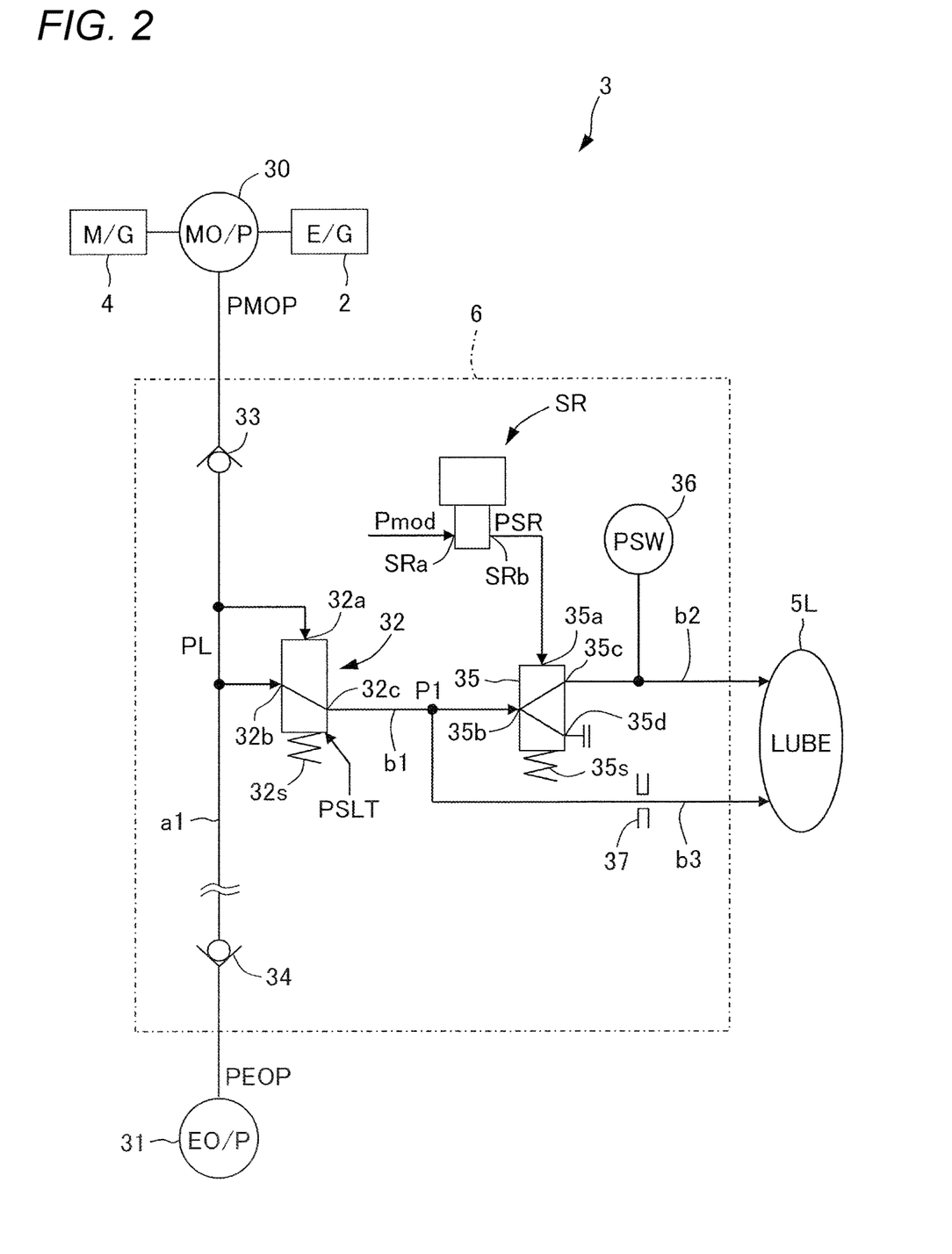
FIG. 2 is a hydraulic circuit diagram showing a part of an oil pressure control device of the hybrid vehicle according to the embodiment.

As shown in FIG. 2, the oil pressure control device 6 is composed of, for example, a valve body and includes a regulator valve 32 that regulates oil pressure from the mechanical oil pump 30 or the motor-driven oil pump 31 into line pressure PL based on a control signal from the ECU 7; a flow rate switching valve 35 that can supply lubricating oil to the lubricating oil passage 5L of the transmission mechanism 5 and is used to switch the amount of lubricating oil supplied; and a signal solenoid valve SR that can supply signal pressure PSR that switches the flow rate switching valve 35. In addition, the oil pressure control device 6 includes linear solenoid valves for supplying and exhausting oil pressure to/from the first clutch C1, the clutch SSC, a motor-disconnecting clutch CM which will be described later, and each of other engagement elements based on control signals from the ECU 7, and can supply and exhaust oil pressure to/from each engagement element.

The regulator valve 32 includes a spool (not shown) biased by a spring 32s, and includes, at one end of the spool, a feedback port 32a, a line pressure port 32b, and a backpressure port 32c. Control pressure PSLT from a linear solenoid valve that is controlled based on the throttle position is supplied to an oil chamber in which the spring 32s is disposed. Oil from the mechanical oil pump 30 is supplied to the feedback port 32a and the line pressure port 32b via a check valve 33 and through a line pressure oil passage a1, and the spool is allowed to move by feedback pressure of the feedback port 32a and the control pressure PSLT of the oil chamber to adjust a communication rate between the line pressure port 32b and the backpressure port 32c, by which the line pressure port 32b is regulated to line pressure PL determined based on the throttle position. Lubricating oil pressure P1 from the backpressure port 32c communicates with an oil passage b1. The check valve 33 allows the flow of oil pressure PMOP from the mechanical oil pump 30 to the regulator valve 32 and restricts the flow of oil pressure to an opposite side.

In addition, the motor-driven oil pump 31 is connected to the line pressure oil passage a1 via a check valve 34. The check valve 34 is interposed between the mechanical oil pump 30 and the motor-driven oil pump 31, and allows the flow of oil pressure PEOP from the motor-driven oil pump 31 to the regulator valve 32 and restricts the flow of oil pressure to an opposite side.

The flow rate switching valve 35 is a spool valve including a spool which is not shown and a spring 35s, and switches oil pressure to be outputted, by movement of the spool according to a relationship between signal pressure PSR supplied from the signal solenoid valve SR and the biasing force of the spring 35s. The flow rate switching valve 35 includes a hydraulic oil chamber 35a for providing a pressing force in a direction in which the spool is switched by the signal pressure PSR; an input port 35b to which the lubricating oil pressure P1 is inputted from the oil passage b1; an output port 35c connected to the lubricating oil passage 5L through an oil passage b2; an interruption port 35d; and the like. In addition, the oil passage b2 is provided with an oil pressure switch (PSW) 36.

The signal solenoid valve SR is, for example, a normally closed solenoid valve, and includes an input port SRa to which modulator pressure Pmod is supplied; and an output port SRb connected to the hydraulic oil chamber 35a of the flow rate switching valve 35, and is controlled by the ECU 7 to generate signal pressure PSR based on the modulator pressure Pmod and supply and exhaust the signal pressure PSR to/from the hydraulic oil chamber 35a. Note that although the present embodiment describes a case in which the oil pressure switch 36 is provided in the oil passage b2, the configuration is not limited thereto. For example, the oil pressure switch 36 may be provided as an oil pressure sensor in an oil passage between the output port SRb of the signal solenoid valve SR and the hydraulic oil chamber 35a of the flow rate switching valve 35, instead of in the oil passage b2.

When the signal solenoid valve SR is in an off state and signal pressure PSR is not outputted from the output port SRb, in the flow rate switching valve 35, the input port 35b communicates with the output port 35c, and lubricating oil pressure P1 from the oil passage b1 is supplied to the lubricating oil passage 5L through the flow rate switching valve 35. In addition, when the signal solenoid valve SR is in an on state and signal pressure PSR is outputted from the output port SRb, in the flow rate switching valve 35, the input port 35b communicates with the interruption port 35d, and lubricating oil pressure P1 from the oil passage b1 is not supplied to the lubricating oil passage 5L through the flow rate switching valve 35.

Meanwhile, the oil passage b1 is connected to the lubricating oil passage 5L through an orifice 37 and an oil passage b3. Hence, lubricating oil pressure P1 from the oil passage b1 is always supplied to the lubricating oil passage 5L through the oil passage b3 while the flow rate is reduced by the orifice 37. Thus, when the signal solenoid valve SR is in an off state, lubricating oil with a high flow rate is supplied to the lubricating oil passage 5L from the oil passage b2 and the oil passage b3, and when the signal solenoid valve SR is in an on state, lubricating oil with a low flow rate is supplied to the lubricating oil passage 5L only from the oil passage b3.

Next, the drive system of the rear wheels 12 will be described. As shown in FIG. 1, the rear motor 20 is connected to the battery 23 through an inverter 24, and is configured to be driven and regenerate freely by the inverter 24 controlling electric power thereof based on a drive instruction from the ECU 7. The rear motor 20 is drive-coupled to a gearbox 21 through the motor-disconnecting clutch CM. The gearbox 21 includes a reduction gear mechanism with a predetermined reduction ratio and a differential device which are not shown. Upon engagement of the gearbox 21 with the motor-disconnecting clutch CM, the gearbox 21 transfers rotation of the rear motor 20 to the left and right rear wheels 12 while reducing the speed of the rotation by the reduction gear mechanism in the gearbox 21 and absorbing differential rotation between left and right axles 12a by the differential device.

Figure 3:
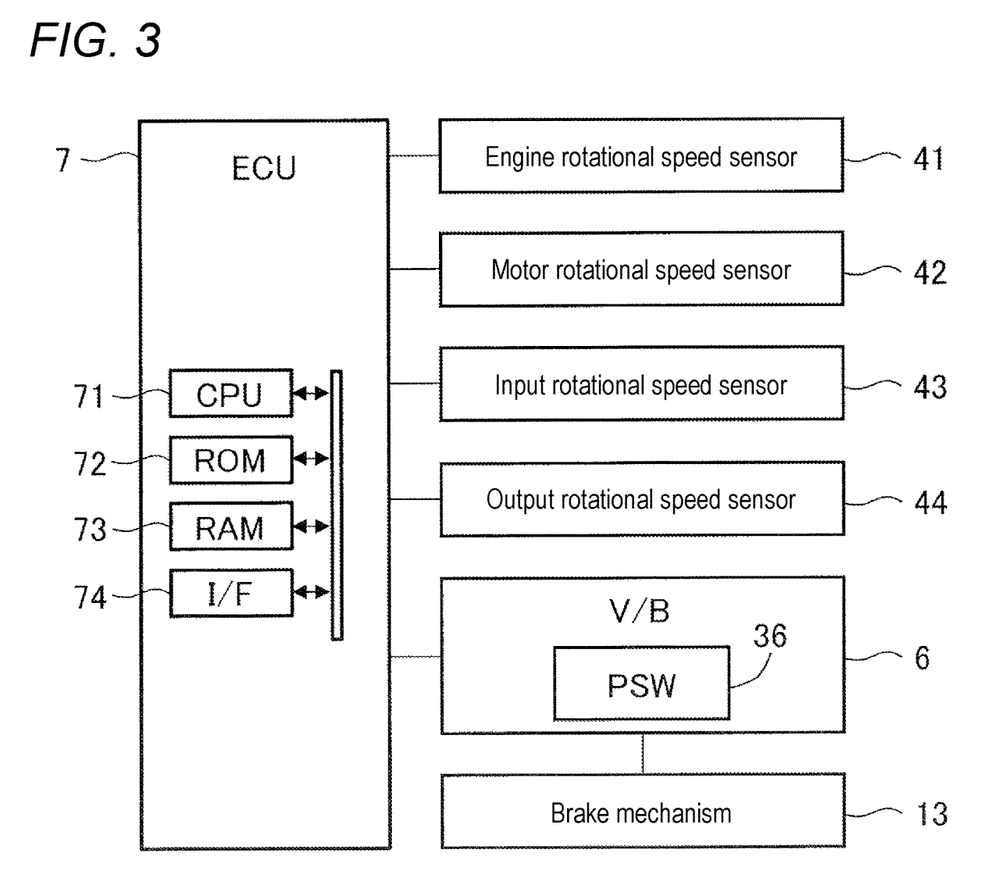
FIG. 3 is a control block diagram showing connections of an ECU of the hybrid vehicle according to the embodiment.

At least one of a pair of the front wheels 11 and a pair of the rear wheels 12 is provided with a brake mechanism 13 (see FIG. 3). In the present embodiment, the brake mechanism 13 is provided on both the front wheels 11 and the rear wheels 12. The brake mechanisms 13 are connected to the oil pressure control device 6 and driven by an operation on a brake pedal, and other than an operation on the brake pedal, by a determination made by the ECU 7 depending on a situation, oil pressure is supplied from the oil pressure control device 6, by which the brake mechanisms 13 can brake the front wheels 11 and the rear wheels 12.

As shown in FIG. 3, the ECU 7 includes, for example, a CPU 71, a ROM 72 that stores a processing program, a RAM 73 that temporarily stores data, and an input and output circuit (I/F) 74, and outputs various types of electrical instructions such as control signals to the oil pressure control device 6 and control signals to the inverters 22 and 24. In order to detect an engagement state of the clutch SSC, etc., to the ECU 7 there are connected the engine rotational speed sensor 41 that detects the rotational speed of the output shaft 2a of the engine 2, the motor rotational speed sensor 42 that detects the rotational speed of the rotor shaft 4a of the motor 4, the input rotational speed sensor 43 that detects the rotational speed of the input shaft 5a of the transmission mechanism 5, the output rotational speed sensor 44 that detects the rotational speed of the output shaft 5b of the transmission mechanism 5, etc. The ECU 7 freely controls engine rotational speed Ne and engine torque Te by providing instructions to the engine 2 through an engine control part which is not shown. In addition, the ECU 7 freely performs control of motor rotational speed Nm by rotational speed control or control of motor torque Tm by torque control, by controlling electric power of the motor 4 through the inverter 22, and freely performs control of motor rotational speed by rotational speed control or control of motor torque by torque control, by controlling electric power of the rear motor 20 through the inverter 24.

The ECU 7 is connected to the oil pressure control device 6 and can output an electrical instruction to the oil pressure control device 6 to increase the flow rate of lubricating oil supplied to the transmission mechanism 5, and can obtain a result of detection by the oil pressure switch 36. By the ECU 7 outputting an electrical instruction to supply oil pressure to the brake mechanisms 13 from the oil pressure control device 6, oil pressure is supplied to the brake mechanisms 13, by which the front wheels 11 and the rear wheels 12 can be braked.

In the hybrid vehicle 100 configured in the above-described manner, as shown in FIG. 1, in traveling using drive power of the engine 2 and/or the motor 4, power outputted from the hybrid drive device 3 is transferred to the front wheels 11 and the motor-disconnecting clutch CM is disengaged, by which the rear motor 20 goes into a state of being disconnected from the rear wheels 12. Then, in the transmission mechanism 5, an optimal shift speed is determined by the ECU 7 according to a shift range, vehicle speed, and accelerator pedal position, by which the oil pressure control device 6 is electronically controlled, forming a shift speed formed based on the transmission determination. In addition, four-wheel drive can be implemented by driving the rear motor 20 by engaging the motor-disconnecting clutch CM when power outputted from the hybrid drive device 3 is transferred to the front wheels 11.

In addition, in the hybrid vehicle 100, as shown in FIG. 2, upon steady traveling with no gear changes, the signal solenoid valve SR is brought into an on state to allow the input port 35b and the interruption port 35d of the flow rate switching valve 35 to communicate with each other, by which the connection between the oil passage b1 and the oil passage b2 is interrupted. By this, lubricating oil with a low flow rate (first flow rate) is supplied to the lubricating oil passage 5L only from the oil passage b3 (first supply mode), by which excess flow of lubricating oil is suppressed and an improvement in gas mileage can be achieved. In addition, for example, upon changing gears during traveling, since the moving parts of the transmission mechanism 5 generate more heat than upon steady traveling, the signal solenoid valve SR is brought into an off state to allow the input port 35b and the output port 35c of the flow rate switching valve 35 to communicate with each other, by which the oil passage b1 is connected to the oil passage b2 and lubricating oil pressure P1 flows through the oil passage b2. By this, lubricating oil with a high flow rate (second flow rate) is supplied to the lubricating oil passage 5L from the oil passage b2 and the oil passage b3 in a joined manner (second supply mode), by which the moving parts of the transmission mechanism 5 can be sufficiently cooled. Namely, the ECU 7 can output an electrical instruction to the oil pressure control device 6 to selectively perform the first supply mode in which the flow rate of lubricating oil supplied to the transmission mechanism 5 from the oil pressure control device 6 is a low flow rate and the second supply mode in which the flow rate supplied to the transmission mechanism 5 from the oil pressure control device 6 is increased to a high flow rate.

Figure 4:
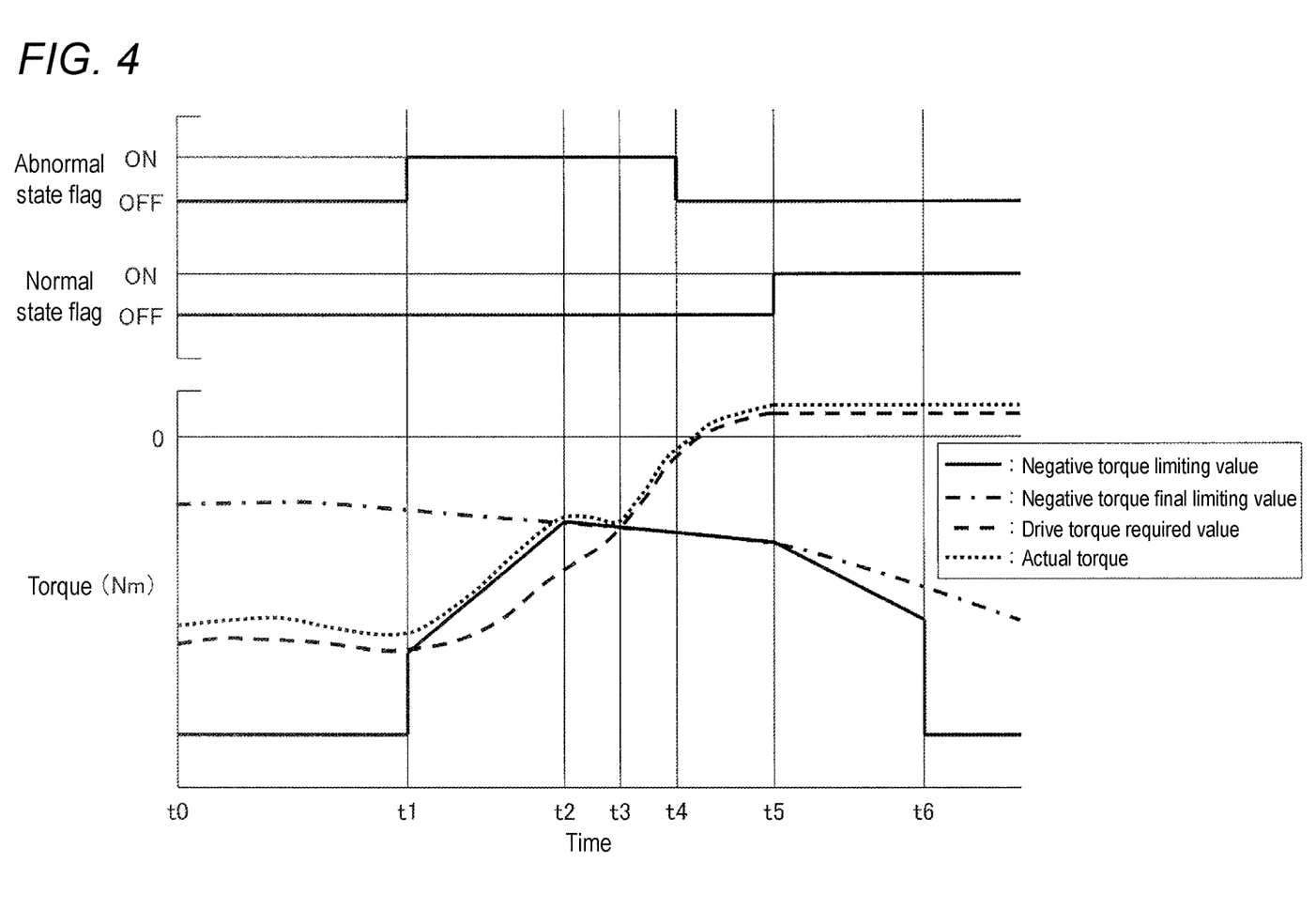
FIG. 4 is a time chart showing operation of the hybrid vehicle according to the embodiment.

Next, operation of each part performed when the hybrid vehicle 100 of the present embodiment performs, during traveling, coasting while regeneration is performed by the motor 4 by stopping the drive of the engine 2 will be described based on a time chart of FIG. 4. As shown in FIG. 4, at time t0, coasting is being performed while engine braking is working by bringing the clutch SSC into a completely engaged state to stop the drive of the engine 2, and the motor 4 is not driven and is performing regeneration, and the motor-disconnecting clutch CM is in a state of being disengaged.

At this time, steady traveling with no gear changes is performed, and since heat generated by the moving parts of the transmission mechanism 5 is small, the amount of lubricating oil supplied to the lubricating oil passage 5L of the transmission mechanism 5 from the oil pressure control device 6 has a low flow rate.

In this state, torque of the transmission mechanism 5 transferred to the engine 2 and the motor 4 from the front wheels 11 is negative torque. In the present embodiment, the magnitude of the negative torque is defined as follows. First, an increase in the negative torque indicates that the negative torque moves away from 0, i.e., the negative torque becomes negative. In addition, a reduction in the negative torque indicates that the negative torque moves toward 0, i.e., the negative torque becomes positive. Namely, in the present embodiment, the magnitude of the negative torque has the same meaning as the magnitude of the absolute value of the negative torque, and the "magnitude of the negative torque" and the "absolute value of the negative torque" are interchangeable terms. The ECU 7 sets, as a negative torque limiting value, a limiting value that limits the magnitude (absolute value) of the negative torque so as to prevent the negative torque from getting too large. At time t0, since heat generated by the moving parts of the transmission mechanism 5 is small because of steady traveling, even if the negative torque increases, the possibility of overheating of the moving parts is small, and thus, the negative torque limiting value is set to be large, i.e., large toward a negative side.

In addition, if the negative torque limiting value is reduced and reaches 0, then it becomes impossible to perform regeneration by the motor 4 or to use engine braking, and thus, in order to prevent the negative torque limiting value from becoming too small and to prevent the negative torque from becoming smaller than the negative torque limiting value, a negative torque final limiting value is set to be more on a negative side than 0. Note that the negative torque final limiting value changes depending on a traveling state such as vehicle speed.

In addition, the ECU 7 sets a drive torque required value of the motor 4 and the engine 2, taking into account vehicle speed, the amount of operation on an accelerator pedal or a brake pedal, a transmission state, etc. Furthermore, the ECU 7 sets actual output torque (actual torque) of the motor 4 and the engine 2 based on the drive torque required value and the negative torque limiting value. At time t0, since the drive torque required value is smaller than the negative torque limiting value, the actual torque is not limited by the negative torque limiting value, and the drive torque required value and the actual torque roughly match each other.

For example, when heat generated by the moving parts of the transmission mechanism 5 is expected to increase because gear changes are performed, in order to supply more lubricating oil to the moving parts, the ECU 7 outputs an electrical instruction to increase the amount of lubricating oil supplied to the lubricating oil passage 5L of the transmission mechanism 5 from the oil pressure control device 6. Here, it is assumed that the signal solenoid valve SR or the flow rate switching valve 35 has caused valve sticking and switching of the flow rate switching valve 35 is not performed, by which lubricating oil pressure P1 does not flow through the oil passage b2, resulting in an abnormal state in which the oil pressure switch 36 does not detect oil pressure. In this case, the ECU 7 determines that despite the ECU 7 outputting an electrical instruction to output signal pressure PSR from the signal solenoid valve SR, the oil pressure switch 36 does not detect oil pressure, and thereby detects occurrence of an abnormal state in which desired lubricating oil pressure P1 is not outputted from the oil passage b2, and considers that a failure has occurred, and sets an abnormal state flag to on (time t1).

If the amount of heat generated by the moving parts of the transmission mechanism 5 increases in this state, then the moving parts are overheated because the amount of lubricating oil supplied has a low flow rate, and thus, it is not desirable. Hence, in the present embodiment, at time t1, in order to limit the negative torque of the transmission mechanism 5, the ECU 7 reduces the negative torque limiting value to the drive torque required value, and then gradually reduces the negative torque limiting value at a predetermined gradient. Note that since the negative torque limiting value is a negative value, the value is increased in the sense of the magnitude of the numerical value, and sweep-up is performed. Namely, when the ECU 7 starts a limitation that the magnitude of the negative torque of the transmission mechanism 5 be reduced (time t1), the ECU 7 reduces the negative torque limiting value at a predetermined gradient. When the negative torque limiting value reaches the negative torque final limiting value, if the negative torque limiting value is further reduced, then regeneration efficiency significantly decreases, and thus, the reduction in the negative torque limiting value is stopped (time t2). Thereafter, the negative torque limiting value changes so as to take the same value as the negative torque final limiting value.

On the other hand, when the drive torque required value has exceeded the negative torque limiting value as a result of the reduction in the negative torque limiting value by the limitation on the torque of the transmission mechanism 5, i.e., when the drive torque required value is more on a negative side than the negative torque limiting value (time t1-t3), the ECU 7 gradually reduces the actual torque of the motor 4 and the engine 2 at a predetermined gradient in accordance with the negative torque limiting value (time t1-t2), and then allows the actual torque to change in accordance with the negative torque final limiting value (time t2-t3). Thereafter, when the drive torque required value has become smaller than the negative torque limiting value again, i.e., when the drive torque required value is more on a positive side than the negative torque limiting value (time t3-), the ECU 7 allows the actual torque of the motor 4 and the engine 2 to change in accordance with the drive torque required value.

In the present embodiment, the ECU 7 changes the actual torque by controlling regeneration torque by controlling feeding of the motor 4. Alternatively, the actual torque may be changed, for example, by controlling torque of the output shaft 2a by valve control of the engine 2, etc., or by upshifting the shift speed. Namely, the ECU 7 can impose a limitation that the magnitude of the negative torque of the transmission mechanism 5 be reduced, by reducing the torque load on the motor 4 or the engine 2. Particularly, in the present embodiment, the ECU 7 can impose a limitation that the magnitude of the negative torque of the transmission mechanism 5 be reduced, by controlling at least one of the regeneration torque of the motor 4 and the output torque of the engine 2.

Namely, when the ECU 7 outputs an electrical instruction to the oil pressure control device 6 to increase the flow rate of lubrication oil supplied to the transmission mechanism 5, and determines that the flow rate of lubricating oil supplied to the transmission mechanism 5 from the oil pressure control device 6 does not increase as indicated by the electrical instruction, the ECU 7 considers that the oil pressure control device 6 is in an abnormal state, and can impose a limitation that the magnitude of the negative torque of the transmission mechanism 5 transferred to the motor 4 and the engine 2 from the front wheels 11 be reduced. In the present embodiment, when the ECU 7 outputs an electrical instruction to the oil pressure control device 6 while a first supply mode is performed, to switch and perform a second supply mode, and determines that the oil pressure control device 6 is not switched to the second supply mode, the ECU 7 considers that the oil pressure control device 6 is in an abnormal state, and can impose a limitation that the magnitude of the negative torque of the transmission mechanism 5 be reduced.

In addition, for example, at time t1-t3, the negative torque of the transmission mechanism 5 is limited and smaller than that in a normal state (time t0-t1, etc.), and thus, a braking force that decelerates the hybrid vehicle 100 is reduced. Hence, it is desirable to compensate for the reduced braking force. Hence, in the present embodiment, when the ECU 7 imposes a limitation that the magnitude of the negative torque of the transmission mechanism 5 be reduced, the ECU 7 outputs an electrical instruction to a brake mechanism 13 to compensate for a braking force that decelerates the hybrid vehicle 100 and that is reduced by imposing the limitation, by increasing a braking force of the brake mechanism 13.

In addition, in the present embodiment, it is assumed that at time t4, the abnormal state in which switching of the flow rate switching valve 35 is not performed is cancelled for some kind of reason. A situation in which the abnormal state is canceled includes, for example, that the flow rate switching valve 35 is switched while maintaining a request to increase the amount of lubricating oil supplied to the lubricating oil passage 5L of the transmission mechanism 5 from the oil pressure control device 6 to a high flow rate, or that a request to increase the amount of lubricating oil supplied to the lubricating oil passage 5L of the transmission mechanism 5 from the oil pressure control device 6 to a high flow rate is canceled and it is OK to maintain a low flow rate. In such a case, the ECU 7 sets the abnormal state flag to off, and after a lapse of a predetermined period of time, at time t5, the ECU 7 sets a normal state flag to on.

In addition, in such a case, there is no need to limit the negative torque of the transmission mechanism 5 to reduce the negative torque limiting value like at time t1-t5, and in order to secure a braking force, the limitation on the negative torque is canceled and the negative torque limiting value is increased (time t5). Here, the negative torque limiting value is gradually increased at a predetermined gradient. Note that since the negative torque limiting value is a negative value, the value is reduced in the sense of the magnitude of the numerical value, and sweep-down is performed. Thus, in a state in which the ECU 7 determines that the oil pressure control device 6 is in an abnormal state (time t1), when the ECU 7 outputs an electrical instruction to the oil pressure control device 6 to increase the flow rate of lubricating oil supplied to the transmission mechanism 5 (time t1-t5), and determines that the flow rate of lubricating oil supplied to the transmission mechanism 5 from the oil pressure control device 6 has increased as indicated by the electrical instruction (time t5), the ECU 7 considers that the oil pressure control device 6 has been switched from the abnormal state to a normal state, and can cancel the limitation that the magnitude of the negative torque of the transmission mechanism 5 be reduced (time t5-t6). Particularly, in the present embodiment, when the ECU 7 cancels the limitation that the magnitude of the negative torque of the transmission mechanism 5 be reduced, the ECU 7 increases the negative torque limiting value at a predetermined gradient.

When the negative torque limiting value has increased so as to be sufficiently away from the drive torque required value, exceeding a predetermined difference from the drive torque required value (time t6), it is determined that overheating of the transmission mechanism 5 does not occur, and the sweep-down is stopped and the negative torque limiting value is set to be large in the same manner as at time t0. Then, the hybrid vehicle 100 performs steady traveling.

As described above, according to the hybrid drive device 3 of the present embodiment, when the ECU 7 outputs an electrical instruction to the oil pressure control device 6 to increase the flow rate of lubrication oil supplied to the transmission mechanism 5, and determines that the flow rate of lubricating oil supplied to the transmission mechanism 5 from the oil pressure control device 6 does not increase as indicated by the electrical instruction, the ECU 7 considers that the oil pressure control device 6 is in an abnormal state, and can impose a limitation that the magnitude of the negative torque of the transmission mechanism 5 be reduced. Hence, upon increasing the amount of lubricating oil supplied to the transmission mechanism 5 to deal with an increase in the amount of heat generated by the transmission mechanism 5, even if an abnormal state occurs in which the amount of lubricating oil supplied to the transmission mechanism 5 does not increase to a desired supplied amount, overheating of the transmission mechanism 5 can be prevented.

In addition, according to the hybrid drive device 3 of the present embodiment, when the ECU 7 outputs an electrical instruction to the oil pressure control device 6 while a first supply mode is performed, to switch and perform a second supply mode, and determines that the oil pressure control device 6 is not switched to the second supply mode, the ECU 7 considers that the oil pressure control device 6 is in an abnormal state, and can impose a limitation that the magnitude of the negative torque of the transmission mechanism 5 be reduced. Hence, in the oil pressure control device 6 having a first supply mode in which the supplied amount has a low flow rate and a second supply mode in which the supplied amount has a high flow rate, upon switching from the first supply mode to the second supply mode to deal with an increase in the amount of heat generated by the transmission mechanism 5, even if an abnormal state occurs in which the oil pressure control device 6 is not switched to the second supply mode, overheating of the transmission mechanism 5 can be prevented.

In addition, according to the hybrid drive device 3 of the present embodiment, the ECU 7 can impose a limitation that the magnitude of the negative torque of the transmission mechanism 5 be reduced, by reducing the torque load on the engine 2 or the motor 4. Particularly, according to the hybrid drive device 3 of the present embodiment, the ECU 7 can impose a limitation that the magnitude of the negative torque of the transmission mechanism 5 be reduced, by controlling at least one of the regeneration torque of the motor 4 and the output torque of the engine 2. Hence, the ECU 7 can limit the negative torque of the transmission mechanism 5 without accompanying the transmission operation of the transmission mechanism 5 with large heat generation.

In addition, according to the hybrid drive device 3 of the present embodiment, when the ECU 7 starts a limitation that the magnitude of the negative torque of the transmission mechanism 5 be reduced, the ECU 7 reduces the negative torque limiting value at a predetermined gradient. Hence, compared to a case in which the negative torque limiting value is suddenly reduced, i.e., a case in which the negative torque limiting value is changed toward a positive side, a sudden reduction in braking force that decelerates the hybrid vehicle 100 can be suppressed.

In addition, according to the hybrid drive device 3 of the present embodiment, when the ECU 7 determines that after limiting the negative torque limiting value, an abnormal state of the oil pressure control device 6 is canceled and the oil pressure control device 6 goes into a normal state, the ECU 7 can cancel the limitation that the magnitude of the negative torque of the transmission mechanism 5 be reduced. Hence, a braking force based on the engine 2 and the motor 4 is secured again, and driver's desired traveling can be implemented.

In addition, according to the hybrid drive device 3 of the present embodiment, when the ECU 7 cancels the limitation that the magnitude of the negative torque of the transmission mechanism 5 be reduced, the ECU 7 increases the negative torque limiting value at a predetermined gradient. Hence, compared to a case in which the negative torque limiting value is suddenly increased, i.e., a case in which the negative torque limiting value is changed toward a negative side, a sudden increase in braking force that decelerates the hybrid vehicle 100 can be suppressed.

In addition, according to the hybrid drive device 3 of the present embodiment, when the ECU 7 imposes a limitation that the magnitude of the negative torque of the transmission mechanism 5 be reduced, the ECU 7 outputs an electrical instruction to a brake mechanism 13 that can brake the front wheels 11, to compensate for a braking force that decelerates the hybrid vehicle 100 and that is reduced by imposing the limitation, by increasing a braking force of the brake mechanism 13. Hence, a braking force that decelerates the hybrid vehicle 100 can be compensated for by increasing a braking force of the brake mechanism 13, and thus, a reduction in drivability can be suppressed.

Note that although in the present embodiment described above, the hybrid drive device 3 is a vehicle drive device mounted on the hybrid vehicle 100 of a single-motor parallel system, the configuration is not limited thereto. Any vehicle drive device can be applied as long as the vehicle drive device includes at least the transmission mechanism 5 and the oil pressure control device 6, and can switch a flow rate supplied to the lubricating oil passage 5L of the transmission mechanism 5.

In addition, although the present embodiment described above describes a case in which when the ECU 7 imposes a limitation that the absolute value of negative torque of the transmission mechanism 5 be reduced, the ECU 7 compensates for a braking force that decelerates the hybrid vehicle 100 and that is reduced by imposing the limitation, by increasing a braking force of a brake mechanism 13, the configuration is not limited thereto. For example, a braking force that decelerates may be compensated for by bringing the motor-disconnecting clutch CM into an engaged state to allow the rear motor 20 to generate regeneration torque.

In addition, although the present embodiment described above describes a case in which when, upon increasing the amount of lubricating oil supplied to the transmission mechanism 5 to deal with an increase in the amount of heat generated by the transmission mechanism 5, an abnormal state has occurred in which the amount of lubricating oil supplied to the transmission mechanism 5 does not increase to a desired supplied amount, the ECU 7 imposes a limitation that the absolute value of negative torque of the transmission mechanism 5 transferred to the engine 2 and the motor 4 from the front wheels 11 be reduced, the configuration is not limited thereto. For example, when an abnormal state has occurred in which the amount of lubricating oil supplied to the transmission mechanism 5 does not increase to a desired supplied amount, the ECU 7 may impose a limitation that the absolute value of positive torque of the transmission mechanism 5 transferred to the front wheels 11 from the engine 2 and the motor 4 be reduced. Namely, the ECU 7 can be configured such that when, upon increasing the amount of lubricating oil supplied to the transmission mechanism 5 to deal with an increase in the amount of heat generated by the transmission mechanism 5, an abnormal state has occurred in which the amount of lubricating oil supplied to the transmission mechanism 5 does not increase to a desired supplied amount, the ECU 7 can impose a limitation that the absolute value of torque of the transmission mechanism 5 transferred between the front wheels 11 and the engine 2 and the motor 4 be reduced. In this case, too, overheating of the transmission mechanism 5 can be prevented.

Note that the present embodiment includes at least the following configurations. A vehicle drive device (3) of the present embodiment includes a transfer mechanism (5) interposed in a power transfer path between a drive source (2, 4) and wheels (11); an oil pressure supplying part (6) that can supply lubricating oil to the transfer mechanism (5); and a control part (7) that can output an electrical instruction to the oil pressure supplying part (6) to increase a flow rate of lubricating oil supplied to the transfer mechanism (5), and when the control part (7) outputs an electrical instruction to the oil pressure supplying part (6) to increase a flow rate of lubricating oil supplied to the transfer mechanism (5), and determines that a flow rate of lubricating oil supplied to the transfer mechanism (5) from the oil pressure supplying part (6) does not increase as indicated by the electrical instruction, the control part (7) considers that the oil pressure supplying part (6) is in an abnormal state, and can impose a limitation that an absolute value of torque of the transfer mechanism (5) transferred between the wheels (11) and the drive source (2, 4) be reduced.

According to this configuration, upon increasing the amount of lubricating oil supplied to the transfer mechanism (5) to deal with an increase in the amount of heat generated by the transfer mechanism (5), even if an abnormal state occurs in which the amount of lubricating oil supplied to the transfer mechanism (5) does not increase to a desired supplied amount, overheating of the transfer mechanism (5) can be prevented.

In addition, in the vehicle drive device (3) of the present embodiment, when the oil pressure supplying part (6) is in the abnormal state, the control part (7) can impose a limitation that an absolute value of negative torque of the transfer mechanism (5) transferred to the drive source (2, 4) from the wheels (11) be reduced. According to this configuration, upon transferring torque to the drive source (2, 4) from the wheels (11), even if an abnormal state occurs in which the amount of lubricating oil supplied does not increase to a desired supplied amount, overheating of the transfer mechanism (5) can be prevented.

In addition, in the vehicle drive device (3) of the present embodiment, the control part (7) can output an electrical instruction to the oil pressure supplying part (6) to selectively perform a first supply mode in which a flow rate of lubricating oil supplied to the transfer mechanism (5) from the oil pressure supplying part (6) is a first flow rate and a second supply mode in which a flow rate supplied to the transfer mechanism (5) from the oil pressure supplying part (6) is increased to a second flow rate higher than the first flow rate, and when the control part (7) outputs an electrical instruction to the oil pressure supplying part (6) while the first supply mode is performed, to switch and perform the second supply mode, and determines that the oil pressure supplying part (6) is not switched to the second supply mode, the control part (7) considers that the oil pressure supplying part (6) is in the abnormal state, and can impose a limitation that an absolute value of the negative torque of the transfer mechanism (5) be reduced.

According to this configuration, in the oil pressure supplying part (6) having the first supply mode in which the supplied amount has a low flow rate and the second supply mode in which the supplied amount has a high flow rate, upon switching from the first supply mode to the second supply mode to deal with an increase in the amount of heat generated by the transfer mechanism (5), even if an abnormal state occurs in which the oil pressure supplying part (6) is not switched to the second supply mode, overheating of the transfer mechanism (5) can be prevented.

In addition, in the vehicle drive device (3) of the present embodiment, the control part (7) can impose a limitation that an absolute value of the negative torque of the transfer mechanism (5) be reduced, by reducing a torque load on the drive source (2, 4). According to this configuration, the control part (7) can limit the negative torque of the transfer mechanism (5) without accompanying the transmission operation of the transfer mechanism (5) with large heat generation.

In addition, the vehicle drive device (3) of the present embodiment includes a rotating electrical machine (4) provided in a power transfer path between an output shaft (2a) of an engine (2) and an input member (5a) of the transfer mechanism (5), and having a rotating shaft (4a) drive-coupled to the input member (5a) of the transfer mechanism (5), the rotating electrical machine (4) serving as the drive source (2, 4), and the control part (7) can impose a limitation that an absolute value of the negative torque of the transfer mechanism (5) be reduced, by controlling at least one of regeneration torque of the rotating electrical machine (4) and output torque of the engine (2). According to this configuration, the control part (7) can limit the negative torque of the transfer mechanism (5) without accompanying the transmission operation of the transfer mechanism (5) with large heat generation.

In addition, in the vehicle drive device (3) of the present embodiment, the control part (7) sets a negative torque limiting value which is a limiting value that limits an absolute value of the negative torque, and reduces the negative torque limiting value at a predetermined gradient when the control part (7) starts a limitation that an absolute value of the negative torque of the transfer mechanism (5) be reduced. According to this configuration, compared to a case in which the negative torque limiting value is suddenly reduced, a sudden reduction in braking force that decelerates a vehicle (100) can be suppressed.

In addition, in the vehicle drive device (3) of the present embodiment, in a state in which the control part (7) determines that the oil pressure supplying part (6) is in the abnormal state, when the control part (7) outputs an electrical instruction to the oil pressure supplying part (6) to increase a flow rate of lubricating oil supplied to the transfer mechanism (5), and determines that a flow rate of lubricating oil supplied to the transfer mechanism (5) from the oil pressure supplying part (6) has increased as indicated by the electrical instruction, the control part (7) considers that the oil pressure supplying part (6) has been switched from the abnormal state to a normal state, and can cancel a limitation that an absolute value of negative torque of the transfer mechanism (5) be reduced. According to this configuration, a braking force based on the drive source (2, 4) is secured again, and driver's desired traveling can be implemented.

In addition, in the vehicle drive device (3) of the present embodiment, the control part (7) sets a negative torque limiting value which is a limiting value that limits an absolute value of the negative torque, and increases the negative torque limiting value at a predetermined gradient when the control part (7) cancels a limitation that an absolute value of the negative torque of the transfer mechanism (5) be reduced. According to this configuration, compared to a case in which the negative torque limiting value is suddenly increased, a sudden increase in braking force that decelerates the vehicle (100) can be suppressed.

In addition, in the vehicle drive device (3) of the present embodiment, when the control part (7) imposes a limitation that an absolute value of the negative torque of the transfer mechanism (5) be reduced, the control part (7) outputs an electrical instruction to a brake mechanism (13) that can brake the wheels (11), to compensate for a braking force that decelerates a vehicle and that is reduced by imposing the limitation, by increasing a braking force of the brake mechanism (13).

According to this configuration, the control part (7) can compensate for a braking force that decelerates the vehicle (100), by increasing a braking force of the brake mechanism (13), and thus can suppress a reduction in drivability.

INDUSTRIAL APPLICABILITY

A vehicle drive device according to the present disclosure can be mounted on a vehicle, e.g., an automobile, and is suitable for use in, for example, a hybrid vehicle of a single-motor parallel system.

REFERENCE SIGNS LIST

2: Engine (drive source), 2a: Output shaft, 3: Hybrid drive device (vehicle drive device), 4: Motor/generator (drive source and rotating electrical machine), 4a: Rotor shaft (rotating shaft), 5: Transmission mechanism (transfer mechanism), 5a: Input shaft (input member), 6: Oil pressure control device (oil pressure supplying part), 7: ECU (control part), 11: Front wheel (wheel), 13: Brake mechanism, and 100: Hybrid vehicle (vehicle)

The invention claimed is:
1. A vehicle drive device comprising:
a transfer mechanism interposed in a power transfer path between a drive source and wheels;
an oil pressure controller that can supply lubricating oil to the transfer mechanism; and
a controller that can output an electrical instruction to the oil pressure controller to increase a flow rate of lubricating oil supplied to the transfer mechanism,
wherein
when the controller outputs an electrical instruction to the oil pressure controller to increase a flow rate of lubricating oil supplied to the transfer mechanism, and determines that a flow rate of lubricating oil supplied to the transfer mechanism from the oil pressure controller does not increase as indicated by the electrical instruction, the controller considers that the oil pressure controller is in an abnormal state, and can impose a limitation that an absolute value of torque of the transfer mechanism transferred between the wheels and the drive source be reduced, wherein:
when the oil pressure controller is in the abnormal state, the controller can impose the limitation that an absolute value of negative torque of the transfer mechanism transferred to the drive source from the wheels be reduced, the controller can output an electrical instruction to the oil pressure controller to selectively perform a first supply mode in which a flow rate of lubricating oil supplied to the transfer mechanism from the oil pressure controller is a first flow rate and a second supply mode in which a flow rate supplied to the transfer mechanism from the oil pressure controller is increased to a second flow rate higher than the first flow rate, and when the controller outputs the electrical instruction to the oil pressure controller while the first supply mode is performed, to switch and perform the second supply mode, and determines that the oil pressure controller is not switched to the second supply mode, the controller considers that the oil pressure controller is in the abnormal state, and can impose the limitation that an absolute value of the negative torque of the transfer mechanism be reduced.

2. The vehicle drive device according to claim 1, wherein the controller can impose the limitation that an absolute value of the negative torque of the transfer mechanism be reduced, by reducing a torque load on the drive source.

3. The vehicle drive device according to claim 2, comprising a rotating electrical machine provided in a power transfer path between an output shaft of an engine and an input member of the transfer mechanism, and having a rotating shaft drive-coupled to the input member of the transfer mechanism, the rotating electrical machine serving as the drive source, wherein the controller can impose the limitation that an absolute value of the negative torque of the transfer mechanism be reduced, by controlling at least one of regeneration torque of the rotating electrical machine and output torque of the engine.

4. The vehicle drive device according to claim 2, wherein the controller sets a negative torque limiting value and reduces the negative torque limiting value at a predetermined gradient when the controller starts the limitation that an absolute value of the negative torque of the transfer mechanism be reduced, the negative torque limiting value being a limiting value that limits an absolute value of the negative torque.

5. The vehicle drive device according to claim 2, wherein in a state in which the controller determines that the oil pressure controller is in the abnormal state, when the controller outputs the electrical instruction to the oil pressure controller to increase the flow rate of lubricating oil supplied to the transfer mechanism, and determines that a flow rate of lubricating oil supplied to the transfer mechanism from the oil pressure controller has increased as indicated by the electrical instruction, the controller considers that the oil pressure controller has been switched from the abnormal state to a normal state, and can cancel the limitation that an absolute value of negative torque of the transfer mechanism be reduced.

6. The vehicle drive device according to claim 5, wherein the controller sets a negative torque limiting value and increases the negative torque limiting value at a predetermined gradient when the controller cancels the limitation that an absolute value of the negative torque of the transfer mechanism be reduced, the negative torque limiting value being a limiting value that limits an absolute value of the negative torque.

7. The vehicle drive device according to claim 2, wherein when the controller imposes the limitation that an absolute value of the negative torque of the transfer mechanism be reduced, the controller outputs the electrical instruction to a brake mechanism that can brake the wheels, to compensate for a braking force that decelerates a vehicle and that is reduced by imposing the limitation, by increasing a braking force of the brake mechanism.

8. The vehicle drive device according to claim 1, comprising a rotating electrical machine provided in a power transfer path between an output shaft of an engine and an input member of the transfer mechanism, and having a rotating shaft drive-coupled to the input member of the transfer mechanism, the rotating electrical machine serving as the drive source, wherein the controller can impose the limitation that an absolute value of the negative torque of the transfer mechanism be reduced, by controlling at least one of regeneration torque of the rotating electrical machine and output torque of the engine.

9. The vehicle drive device according to claim 1, wherein the controller sets a negative torque limiting value and reduces the negative torque limiting value at a predetermined gradient when the controller starts the limitation that an absolute value of the negative torque of the transfer mechanism be reduced, the negative torque limiting value being a limiting value that limits an absolute value of the negative torque.

10. The vehicle drive device according to claim 1, wherein in a state in which the controller determines that the oil pressure controller is in the abnormal state, when the controller outputs the electrical instruction to the oil pressure controller to increase a flow rate of lubricating oil supplied to the transfer mechanism, and determines that the flow rate of lubricating oil supplied to the transfer mechanism from the oil pressure controller has increased as indicated by the electrical instruction, the controller considers that the oil pressure controller has been switched from the abnormal state to a normal state, and can cancel the limitation that an absolute value of negative torque of the transfer mechanism be reduced.

11. The vehicle drive device according to claim 10, wherein the controller sets a negative torque limiting value and increases the negative torque limiting value at a predetermined gradient when the controller cancels the limitation that an absolute value of the negative torque of the transfer mechanism be reduced, the negative torque limiting value being a limiting value that limits an absolute value of the negative torque.

12. The vehicle drive device according to claim 1, wherein when the controller imposes the limitation that an absolute value of the negative torque of the transfer mechanism be reduced, the controller outputs an electrical instruction to a brake mechanism that can brake the wheels, to compensate for a braking force that decelerates a vehicle and that is reduced by imposing the limitation, by increasing a braking force of the brake mechanism.

13. The vehicle drive device according to claim 1, wherein the controller can impose the limitation that an absolute value of the negative torque of the transfer mechanism be reduced, by reducing a torque load on the drive source.

14. The vehicle drive device according to claim 1, comprising a rotating electrical machine provided in a power transfer path between an output shaft of an engine and an input member of the transfer mechanism, and having a rotating shaft drive-coupled to the input member of the transfer mechanism, the rotating electrical machine serving as the drive source,
wherein
the controller can impose the limitation that an absolute value of the negative torque of the transfer mechanism be reduced, by controlling at least one of regeneration torque of the rotating electrical machine and output torque of the engine.

15. The vehicle drive device according to claim 1, wherein the controller sets a negative torque limiting value and reduces the negative torque limiting value at a predetermined gradient when the controller starts the limitation that an absolute value of the negative torque of the transfer mechanism be reduced, the negative torque limiting value being a limiting value that limits an absolute value of the negative torque.

16. The vehicle drive device according to claim 1, wherein in a state in which the controller determines that the oil pressure controller is in the abnormal state, when the controller outputs the electrical instruction to the oil pressure controller to increase the flow rate of lubricating oil supplied to the transfer mechanism, and determines that a flow rate of lubricating oil supplied to the transfer mechanism from the oil pressure controller has increased as indicated by the electrical instruction, the controller considers that the oil pressure controller has been switched from the abnormal state to a normal state, and can cancel the limitation that an absolute value of negative torque of the transfer mechanism be reduced.

17. The vehicle drive device according to claim 16, wherein the controller sets a negative torque limiting value and increases the negative torque limiting value at a predetermined gradient when the controller cancels the limitation that an absolute value of the negative torque of the transfer mechanism be reduced, the negative torque limiting value being a limiting value that limits an absolute value of the negative torque.

18. The vehicle drive device according to claim 1, wherein when the controller imposes the limitation that an absolute value of the negative torque of the transfer mechanism be reduced, the controller outputs an electrical instruction to a brake mechanism that can brake the wheels, to compensate for a braking force that decelerates a vehicle and that is reduced by imposing the limitation, by increasing a braking force of the brake mechanism.

* * * * *